US006954366B2

(12) United States Patent
Lai et al.

(10) Patent No.: US 6,954,366 B2
(45) Date of Patent: Oct. 11, 2005

(54) MULTIFUNCTION HYBRID INTELLIGENT UNIVERSAL TRANSFORMER

(75) Inventors: Jih-Sheng Lai, Blacksburg, VA (US); Arshad Mansoor, Oak Ridge, TN (US); Arindam Maitra, Knoxville, TN (US); Frank Goodman, Palo Alto, CA (US)

(73) Assignee: Electric Power Research Institute, Palo Alto, CA (US)

( * ) Notice: Subject to any disclaimer, the term of this patent is extended or adjusted under 35 U.S.C. 154(b) by 59 days.

(21) Appl. No.: 10/723,620

(22) Filed: Nov. 25, 2003

(65) Prior Publication Data

US 2005/0111245 A1 May 26, 2005

(51) Int. Cl.$^7$ ............................................ H02M 7/537
(52) U.S. Cl. ........................................................ 363/71
(58) Field of Search .............................. 363/65, 67, 71, 363/74

(56) References Cited

U.S. PATENT DOCUMENTS

| | | | |
|---|---|---|---|
| 4,768,141 A | 8/1988 | Hubertus et al. | |
| 5,065,303 A | 11/1991 | Nguyen et al. | |
| 5,138,544 A | 8/1992 | Jessee | |
| 5,337,227 A | 8/1994 | Stacey et al. | |
| 5,349,517 A | * 9/1994 | Brennen .................... | 363/40 |
| 5,355,295 A | * 10/1994 | Brennen .................... | 363/40 |

(Continued)

FOREIGN PATENT DOCUMENTS

GB        2 294 821        8/1996

OTHER PUBLICATIONS

Aeloiza et al., "Next Generation Distribution Transformer: To address Power Quality for Critical Loads", vol. 2: Statistical Summary Report, May 1996.
Tolbert et al., "A Multilevel Converter–Based Universal Power Conditioner", PESC'99 Jun.27–Jul. 1, pp 393–399.
Schibili et al., "A Three–Phase Multilevel Converter for High–Power Induction Motors", 1998 IEEE vol. 13, No. 5, Sep. 1998 pp. 978–986.

(Continued)

*Primary Examiner*—Adolf Berhane
(74) *Attorney, Agent, or Firm*—Morgan Lewis & Bockius, LLP (57) ABSTRACT

A multifunction hybrid intelligent universal transformer includes a conventional transformer coupled with power electronics on the secondary side to enhance the functionality of power conversion. The universal transformer includes features for overcoming the deficiencies associated with conventional transformers, including voltage sag compensation, instantaneous voltage regulation, outage compensation, capacitor switching protection, harmonic compensation, single-phasing protection, DC output, and variable frequency output.

9 Claims, 7 Drawing Sheets

U.S. PATENT DOCUMENTS

| | | | |
|---|---|---|---|
| 5,361,196 A | | 11/1994 | Tanamachi et al. |
| 5,446,642 A | | 8/1995 | McMurray |
| 5,446,643 A | | 8/1995 | McMurray |
| 5,465,203 A | * | 11/1995 | Bhattacharya et al. ........ 363/40 |
| 5,467,262 A | | 11/1995 | Nakata et al. |
| 5,523,937 A | | 6/1996 | Kähkipuro |
| 5,532,575 A | | 7/1996 | Ainsworth et al. |
| 5,563,780 A | | 10/1996 | Goad |
| 5,566,061 A | | 10/1996 | Uchino |
| 5,587,891 A | | 12/1996 | Nakata et al. |
| 5,621,628 A | | 4/1997 | Miyazaki et al. |
| 5,642,275 A | | 6/1997 | Peng et al. |
| 5,644,483 A | | 7/1997 | Peng et al. |
| 5,694,307 A | | 12/1997 | Murugan |
| 5,731,970 A | | 3/1998 | Mori et al. |
| 5,734,257 A | * | 3/1998 | Schauder et al. ........... 323/207 |
| 5,742,493 A | | 4/1998 | Ito et al. |
| 5,757,633 A | * | 5/1998 | Bowles ........................ 363/71 |
| 5,801,936 A | | 9/1998 | Mori et al. |
| 5,805,437 A | | 9/1998 | Grüning |
| 5,831,842 A | | 11/1998 | Ogasawara et al. |
| 5,835,371 A | | 11/1998 | Kume et al. |
| 5,841,645 A | | 11/1998 | Sato |
| 5,889,662 A | | 3/1999 | Schettler et al. |
| 5,889,668 A | | 3/1999 | Schauder et al. |
| 5,905,367 A | | 5/1999 | Hochgraf |
| 5,933,339 A | | 8/1999 | Duba et al. |
| 5,940,285 A | | 8/1999 | Carrere et al. |
| 5,943,229 A | | 8/1999 | Sudhoff |
| 5,949,664 A | | 9/1999 | Bernet et al. |
| 5,969,959 A | | 10/1999 | Odegard et al. |
| 5,995,391 A | | 11/1999 | Davies et al. |
| 6,005,362 A | | 12/1999 | Enjeti et al. |
| 6,005,788 A | | 12/1999 | Lipo et al. |
| 6,009,002 A | | 12/1999 | Steimer |
| 6,031,738 A | | 2/2000 | Lipo et al. |
| 6,040,990 A | | 3/2000 | Courault |
| 6,058,031 A | | 5/2000 | Lyons et al. |
| 6,108,223 A | | 8/2000 | Julian et al. |
| 6,118,676 A | | 9/2000 | Divan et al. |
| 6,144,567 A | | 11/2000 | Asplund et al. |
| 6,151,227 A | | 11/2000 | Mizutani et al. |
| 6,154,379 A | | 11/2000 | Okita |
| 6,169,672 B1 | | 1/2001 | Kimura et al. |
| 6,169,676 B1 | | 1/2001 | Dähler et al. |
| 6,175,166 B1 | | 1/2001 | Bapat |
| 6,226,192 B1 | | 5/2001 | Yamanaka et al. |
| 6,229,722 B1 | | 5/2001 | Ichikawa et al. |
| 6,236,580 B1 | | 5/2001 | Aiello et al. |
| 6,288,915 B1 | | 9/2001 | Stemmier et al. |
| 6,301,130 B1 | | 10/2001 | Aiello et al. |
| 6,307,760 B1 | | 10/2001 | Ikimi |
| 6,310,787 B2 | | 10/2001 | Ito et al. |
| 6,353,547 B1 | | 3/2002 | Jang et al. |
| 6,404,655 B1 | | 6/2002 | Welches |
| 6,411,530 B2 | | 6/2002 | Hammond et al. |
| 6,459,596 B1 | | 10/2002 | Corzine |
| 6,480,403 B1 | | 11/2002 | Bijlenga |
| 6,490,182 B2 | | 12/2002 | Katoh et al. |
| 6,507,503 B2 | | 1/2003 | Norrga |
| 6,510,063 B2 | | 1/2003 | Kobayashi et al. |
| 6,594,162 B2 | | 7/2003 | Shinoda et al. |
| 6,597,590 B2 | | 7/2003 | Ikimi et al. |
| 6,603,672 B1 | | 8/2003 | Deng et al. |
| 2001/0026460 A1 | | 10/2001 | Ito et al. |
| 2001/0038541 A1 | | 11/2001 | Hammond et al. |
| 2002/0167825 A1 | | 11/2002 | Okayama et al. |
| 2003/0043603 A1 | | 3/2003 | Schreiber |
| 2003/0156437 A1 | | 8/2003 | Gruening |

OTHER PUBLICATIONS

Manjrekar et al., "Hybrid Multilevel Power Conversion System: a competitive solution for high power applications", Department of Electrical and Computer Engineering, 1999.

Chiasson et al., "Harmonic Elimination in Multilevel Converters", ECE Dept. The University of Tennessee, pp. 1–6.

Tolbert et al., "Multilevel Converters for Large Electric Drives", APEC 1998, Feb. 15–19, 1998, pp. 530–536.

Tolbert et al., "Multilevel Converters as a Utility Interface for Renewable Energy Systems".

F. Goodman, "Feasibility Assessment for Intelligent Universal Transformer", Technical Report Final Report Dec. 2002, Chapter 4, pp. 4–1–4–19.

EPRI, "Tailored Collaboration Opportunities; DVR with Integrated Transformer (DVRT)", 1998 Electric Power Research Institute Inc.

Jih–Sheng Lai, "Designing the Next Generation Distribution Transformers: New Power Electronics–Based Hybrid and Solid–State Design Approaches", Proceedings of the lasted International Conference, Power and Energy Systems, Feb. 24–26, 2003 pp. 262–267.

Nergaard et al., "Design Considerations for a 48 V Fuel Cell to Split Single Phase Inverter System with Ultacapcitor Energy Storage", IEEE, 2002, pp. 2007–2012.

Lai et al., "Multilevel Converters—A New Breed of Power Converters", IEEE, 1996, pp. 509–517.

Rodriguez et al., "Multilevel Inverters: A Survey of Topologies, Controls, and Applications", IEEE Transactions on Industrial Electronics, vol. 49, No. 4, Aug. 2002, pp. 724–738.

* cited by examiner

MULTIFUNCTION HYBRID INTELLIGENT UNIVERSAL TRANSFORMER

TECHNICAL FIELD

The present invention relates generally to power conversion technology, and in particular to a universal transformer for enhancing the functionality of power conversion in electrical distribution systems.

BACKGROUND

Transformers make up a large portion of power delivery systems throughout the world and are the backbone of electric power conversion systems. The positive attributes of conventional distribution transformers have been well documented for years and include low cost, high reliability, and high efficiency. Were it not for these highly reliable devices, the distance separating generators from consumers would have been significantly greater. Indeed, to distribute power over such distances would require many households and industries to operate their own substations, resulting in electricity being a much less practical form of energy.

Like other devices in modern electrical distribution systems, the conventional transformer has some drawbacks. The drawbacks include voltage drop under load, inability to mitigate "flicker," sensitivity to harmonics, environmental impacts when mineral oil leaks occur, limited performance under DC-offset load unbalances, inability to convert single-phase service to three-phase for powering certain types of equipment and no energy-storage capacity. One consequence of not having energy storage capacity is that the output can be easily interrupted because of a disturbance at the input. Also, when the output load current generates harmonics and reactive power, the conventional transformer reflects them back to the input side.

Power-line disturbances, such as voltage sags and momentary interruptions, cost electric utility customers billions of dollars every year. With today's increased complexity of process automation, even if only a small segment of a process is vulnerable, power disruptions may interrupt the entire automated process. In response to this perceived market need, a broad range of distribution-class, power-conditioning devices, commonly known as "custom power" devices have been introduced in the market. These custom power devices include reactive power and harmonic compensation devices, such as the Adaptive Var Compensator (AVC) and voltage sag and momentary interruption protection devices, such as a Dynamic Voltage Restorer (DVR). Unfortunately, the customer response to these new lines of products has not been receptive, mainly because of their cost.

SUMMARY

A multifunction hybrid intelligent universal transformer includes a conventional transformer coupled with power electronics on the secondary side to enhance the functionality of power conversion.

In some embodiments of the present invention, a power conversion device comprises a transformer having a primary input winding and multiple secondary output windings. A switched inverter circuit is coupled to the secondary output windings and configurable to couple a first output winding with a parallel path inverter and configurable to couple a second output winding with a series path inverter.

In some embodiments, an energy storage device (e.g., ultra-capacitor, battery) can be coupled to the parallel path inverter for mitigating voltage disturbances.

In some embodiments, an active or diode-bridge AC/DC converter block (e.g., full-bridge rectifier) can be coupled to the parallel path inverter for converting Alternating Current (AC) waveforms into Direct Current (DC) waveforms to maintain clean input current with unity power factor.

In some embodiments, a filter can be coupled to the output of the switched inverter for smoothing output waveforms.

A significant advantage of the present invention is the combining of a conventional distribution transformer with the functionalities of one or more custom power devices into a single, tightly integrated, electrical customer interface, rather than the costly conventional solution of adding separate custom power devices to the power distribution system.

DETAILED DESCRIPTION

As pressures increase on electric service providers to provide a higher quality and reliable product on demand when customers need it and at a price point that is acceptable to customers, there is desire to increase utilization of conventional transformers. One possible improvement is to integrate the functionalities of custom power devices into an existing distribution transformer. Such a "hybrid" transformer would significantly alter the way electric utilities serve their respective customers and expand the capabilities of a conventional distribution transformer from primarily a voltage transformation device to an integrated, electrical customer interface. The hybrid transformer would enable service providers to broaden their traditional service offerings, satisfy a myriad of customer requirements for power quality, and at the same time provide advanced distribution automation functionalities.

A multifunction hybrid intelligent universal transformer would ideally combine a conventional distribution transformer with the functionalities of one or more custom power devices to provide an integrated electrical customer interface. The universal transformer should include features for overcoming the deficiencies associated with conventional transformers, including voltage sag compensation, instantaneous voltage regulation, outage compensation, capacitor switching protection, harmonic compensation, single-phasing protection, DC output, and variable frequency output (e.g., 50 Hz, 60 Hz, 400 Hz, etc.).

Overview of Universal Transformer

Figure 1:
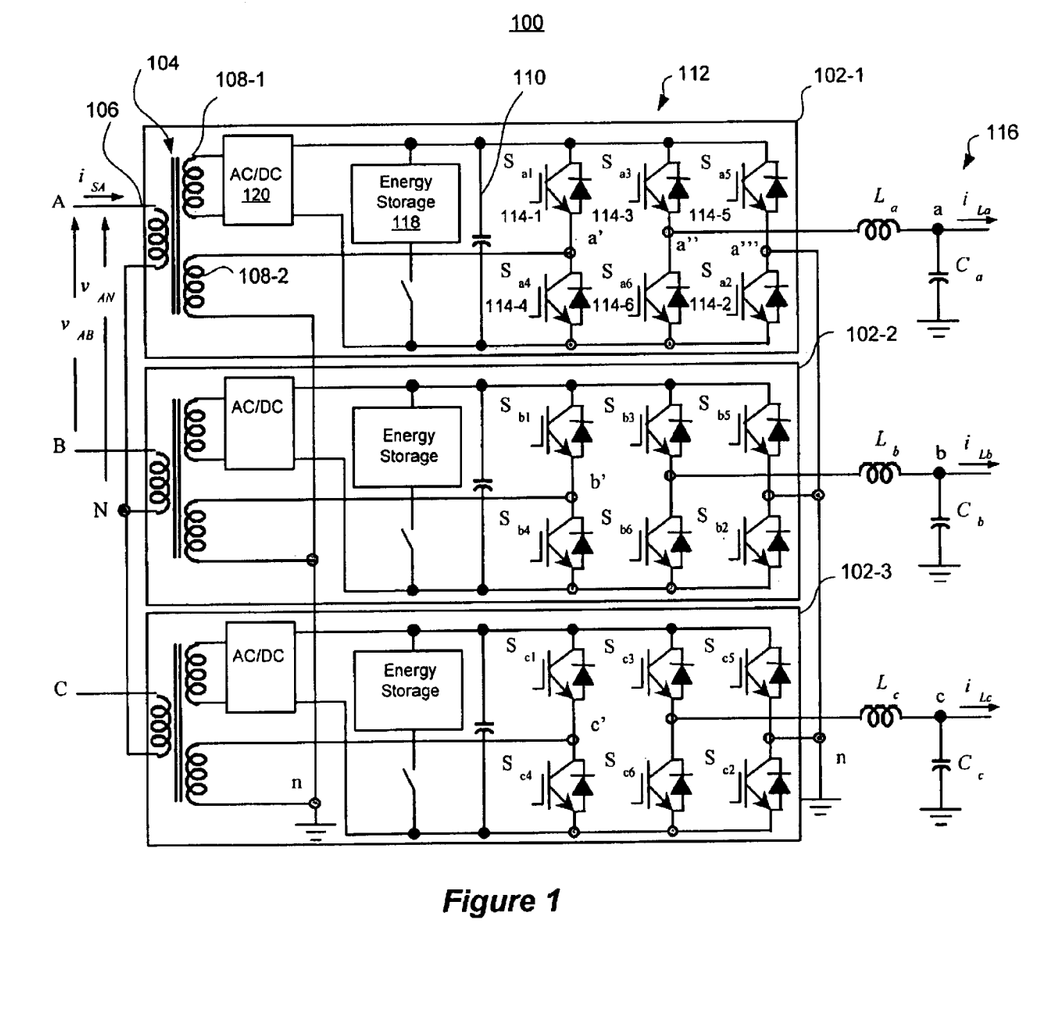
FIG. 1 is a circuit diagram of a three-phase universal transformer, in accordance with some embodiments of the present invention.

FIG. 1 is a circuit diagram of a three-phase universal transformer 100, in accordance with some embodiments of the present invention. For each phase-leg of the universal transformer 100 there is a power conversion circuit 102-1 through 102-3. For simplification, only the power conversion circuit 102-1 (phase-leg a) will be described, since the power conversion circuits 102-2 and 102-3 (phase-legs b and c) operate in a similar manner.

The power conversion circuit 102-1 includes a conventional transformer 104 having a primary input winding 106 and secondary output windings 108-1 and 108-2, a DC bus capacitor circuit 110 and an actively switched inverter circuit 112. The switched inverter circuit 112 includes semiconductor switches 114-1 through 114-6 that can be rapidly switched (approximately at 20,000 to 40,000 Hz) to convert the DC voltage stored at the DC bus capacitor circuit 110 to an AC waveform. In some embodiments, the number of switches 114 and their rate of switching may be different from the exemplary values of the embodiment shown in FIG. 1.

The switches 114 can be configured to provide a parallel path inverter coupled to the secondary winding 108-1 or a series path inverter coupled to the secondary output winding 108-2. The switched inverter 112 can have many different inverter circuit topology options. For example, the parallel path inverter can be a half bridge-based inverter, which relies on capacitor-split sources and phase-leg switches to produce PWM (pulse width modulated) output. The DC bus capacitor 110 can be any DC voltage source (e.g., capacitor bank, battery) capable of maintaining voltage for a sufficient period of time to compensate for a disturbance or interruption.

In some embodiments, the conventional transformer 104 steps down a high voltage level (e.g., 12000 Volts) received from utility lines to a low voltage level (e.g., 120 Volts) suitable for consumer applications at a variable frequency (e.g., 50 Hz, 60 Hz, or 400 Hz). In addition to transforming voltage, the transformer 104 isolates the input voltage and current from the secondary or load side of the transformer 104. Thus, transients generated by a power factor correction capacitor switching event will not propagate to the secondary or load side of the transformer 104.

The secondary output winding 108-1 of the transformer 104 is coupled across the switched inverter 112. The secondary output winding 108-2 has a first terminal coupled to switches 114-1 and 114-4 (node a') and a second terminal coupled to ground. The node between switches 114-2 and 114-5 (node a''') is also coupled to circuit ground. The switches 114 can include Gate-Turn-Off (GTO) Thyristors, Integrated Gate Bipolar Transistors (IGBTs), MOS Turn-off Thyristors (MTOs), Integrated-Gate Commutated Thyristors (IGCTs), Silicon Controlled Rectifiers (SCRs) or any other semiconductor devices that have a turn-off capability.

In some embodiments, a filter circuit 116 is coupled to the output of the inverter 112 (node a") for smoothing the output AC waveform. By adding the filter circuit 116 to the output, the AC output waveform is sinusoidal with substantially reduced ripple. In some embodiments, the filter circuit 116 includes an inductive element $L_a$ coupled to a shunt capacitance $C_a$ to form a low pass filter. In other embodiments, the inductive element $L_a$ can be coupled in series with the capacitance $C_a$ to form a low pass filter. Note that other combinations of passive and/or active devices can be coupled to the switched inverter 112 for smoothing the output waveform using well-known filter design techniques.

If the transformer 100 is used in an application or system that requires outage compensation or short-term interruption protection, an energy storage device 118 can be coupled across the inputs of the parallel path inverter to ride-through these disturbances. When the input source voltage drops for a short period of time, the energy storage device 118 compensates for the deficit and maintains constant output voltage. The total period of compensation as a function of the amount of energy storage can be adapted as desired. The energy storage device 118 can include capacitor banks, ultra-capacitors, flywheels, batteries, or any other suitable storage media (or any combination thereof). In some embodiments, the energy storage device 118 can be switched into the power conversion circuit 102-1 upon detection of a voltage sag and/or to provide outage compensation.

In some embodiments, the secondary output winding 108-1 is coupled to an AC/DC converter block 120 to obtain a DC source, and the secondary output winding 108-2 is coupled in series with switches 114-4, 114-6 and 114-2, which can be configured as a full-bridge inverter, enabling the output voltage to be actively compensated when there is an interruption at the primary side of the transformer 100. In some embodiments, depending upon the power flow direction requirement of the AC/DC converter block 120, the AC/DC converter block 120 can be a diode bridge or an active full-bridge inverter. If the AC/DC converter block 120 output is a unidirectional power flow that allows power transmission only from the primary side to the secondary side of the transformer 100, then a diode bridge can be used as a low cost alternative. If the AC/DC converter block 120 output needs to allow power flow back to the primary side of the transformer 100, then the AC/DC converter block 120 can be replaced with a full-bridge converter to avoid high harmonic contributions at the primary side of the transformer 100.

Figure 2:
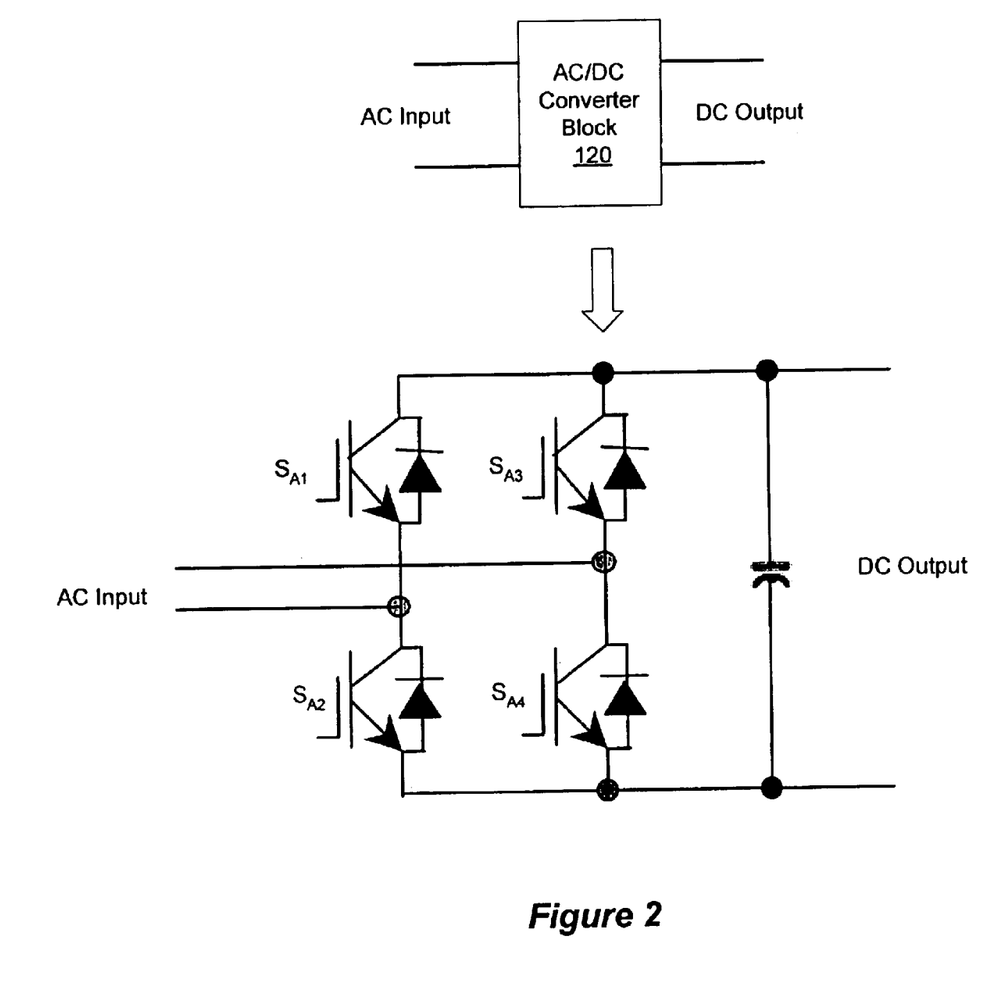
FIG. 2 is a circuit diagram of an active AC/DC converter block, in accordance with some embodiments of the present invention.

FIG. 2 is a circuit diagram of an AC/DC converter block 120, in accordance with some embodiments of the present invention. In some embodiments, the AC/DC converter block 120 is a full-bridge converter that can be used as an active rectifier block. The input to the converter block 120 is AC and the output is DC. With switching control (not shown), the input current can be controlled such that the input is a clean sinusoidal waveform and in phase with the input voltage, regardless of the type of output load (e.g., linear or nonlinear output loads). Note that each switch 114 includes an IGBT and an anti-paralleled diode. If all the IGBTs are removed, then the current becomes a diode-bridge that only allows current or power to flow in one direction (i.e., from AC input to DC output).

Figure 3:
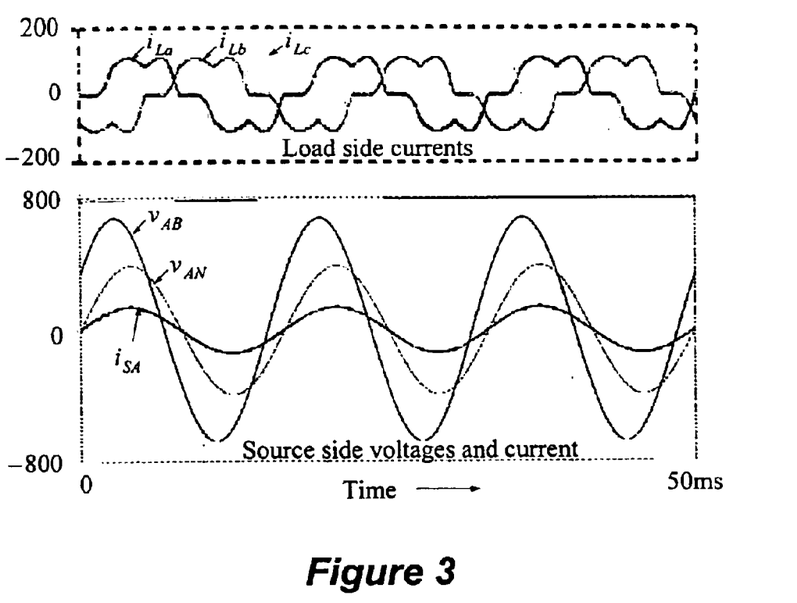
FIG. 3 is a graph illustrating harmonic compensation, in accordance with some embodiments of the present invention.

FIG. 3 is a graph illustrating harmonic compensation, in accordance with some embodiments of the present invention. The waveforms shown in FIG. 3 were generated by a simulation of the universal transformer 100, with the universal transformer 100 output connected to a nonlinear load and the output currents, $i_{La}$, $i_{Lb}$, and $i_{Lc}$ harmonic distorted. As can be observed from in FIG. 3, with an actively switched converter block 120 for rectification, the input current $i_{SA}$ becomes sinusoidal and in phase with the input source voltage, $v_{AN}$. Note that FIG. 3 also shows the input line-to-line voltage, $v_{AB}$, which is 30 degrees leading the input source voltage, $v_{AN}$.

Operation of Universal Transformer

The operation of the universal transformer 100 can be described by examining the operation of the power conversion circuit 102-1 for various switch 114 configurations. Note that the power conversion circuits 102-2 and 102-3 (phase-legs b and c) of the transformer 100 operate in a similar manner.

In some embodiments, the switches 114-1 ($S_{a1}$), 114-3 ($S_{a3}$), 114-4($S_{a4}$) and 114-6 ($S_{a6}$) form an inverter that has an AC output in series with the transformer 104 output. The basic operation is to switch $S_{a1}$-$S_{a6}$ and $S_{a4}$-$S_{a3}$ pairs in an alternating fashion so that the inverter 112 output voltage is an alternating chopped DC voltage. The filter 116 smoothes the chopped DC voltage into a clean, sinusoidal waveform.

In some embodiments, the switches 114-2 ($S_{a2}$), 114-3 ($S_{a3}$), 114-5 ($S_{a5}$) and 114-6 ($S_{a6}$) form an inverter that can produce AC output independent from the input voltage, $V_{AB}$. The basic operation is to switch the $S_{a3}$-$S_{a2}$ and $S_{a5}$-$S_{a6}$ pairs in an alternating fashion so that the inverter 112 output voltage is an alternating chopped DC voltage independent from the input voltage, $V_{AB}$. The chopped DC voltage is then smoothed into a clean, sinusoidal waveform by the filter circuit 116.

The switches 114 can be controlled by an external control means using either analog or digital control signals in a manner commonly known to one of ordinary skill in the art. For example, the states of switches 114 can be controlled using Pulse-width modulation (PWM) techniques. In PWM, the width of pulses in a pulse train are modified in direct proportion to a small control voltage. By using a sinusoid of a desired frequency as the control voltage, it is possible to produce a waveform whose average voltage varies sinusoidally in a manner suitable for driving the switches 114. An embodiment of a pulse-width modulation inverter control circuit is described below with respect to FIG. 9.

Table I below shows the two basic configurations for switches 114-1 through 114-6 and the corresponding inverter output. Note that an "X" in Table I indicates that the switch is used to perform the output function.

TABLE I

| \multicolumn{6}{c}{Switch Configurations} | |
|---|---|---|---|---|---|---|
| $S_{a1}$ | $S_{a2}$ | $S_{a3}$ | $S_{a4}$ | $S_{a5}$ | $S_{a6}$ | Output Function |
| X |  | X | X |  | X | AC output in series with transformer output |
|  | X | X |  | X | X | AC output independent of transformer input |
|  |  | X |  |  |  | DC output |

In some embodiments, the universal transformer 100 can be configured to provide single-phase protection. For example, if the input power source has a missing phase or is running under a single-phase condition, the switched inverter 112 can be configured to turn off one or more phase-legs to prevent the universal transformer 100 from operating under an abnormal source condition.

In some embodiments, the universal transformer 100 can be configured to provide DC output. For example, the switched inverter 112 can be configured to provide an interleaved three-leg DC/DC converter to provide DC output with only $S_{a3}$, $S_{b3}$ and $S_{c3}$ conducting.

Figure 4:
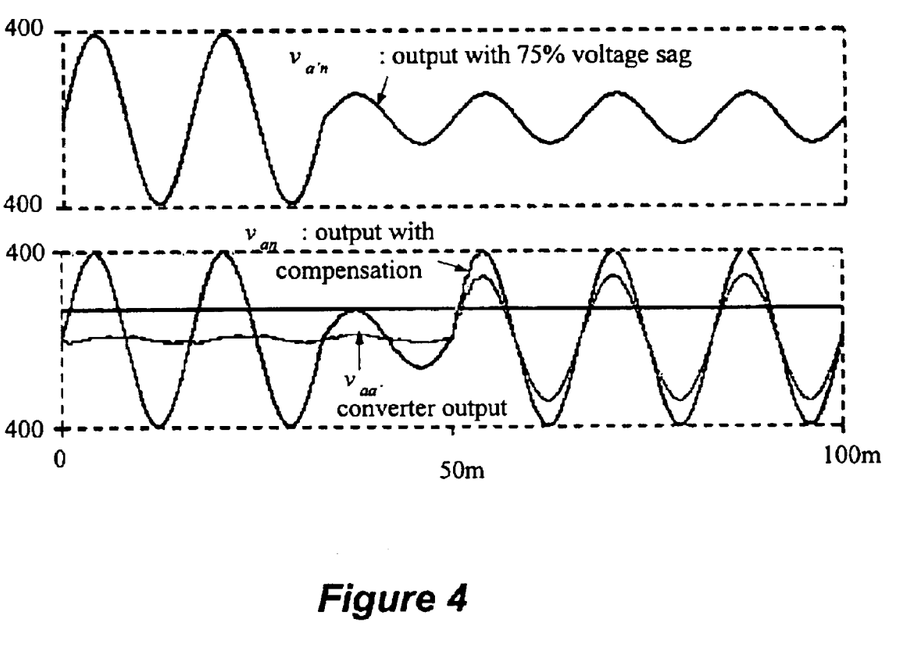
FIG. 4 is a graph illustrating voltage sag compensation, instantaneous voltage regulation and outage compensation, in accordance with some embodiments of the present invention.

FIG. 4 is a graph illustrating voltage sag compensation, instantaneous voltage regulation and outage compensation, in accordance with some embodiments of the present invention. The waveforms shown in FIG. 4 were generated from a simulation in which the first two cycles show normal operation and the third cycle shows a 75% voltage sag (shown as $V_{an}$). The voltage sag may last a few cycles, but the output voltage $V_{an}$ can be compensated by the switching inverter 112 to maintain a full-voltage output. With the series inverter path, the universal transformer 100 is capable of supplying full voltage continuously without the need of the energy storage device 120 even if the input source voltage drops to 50% of its normal voltage.

Figure 5:
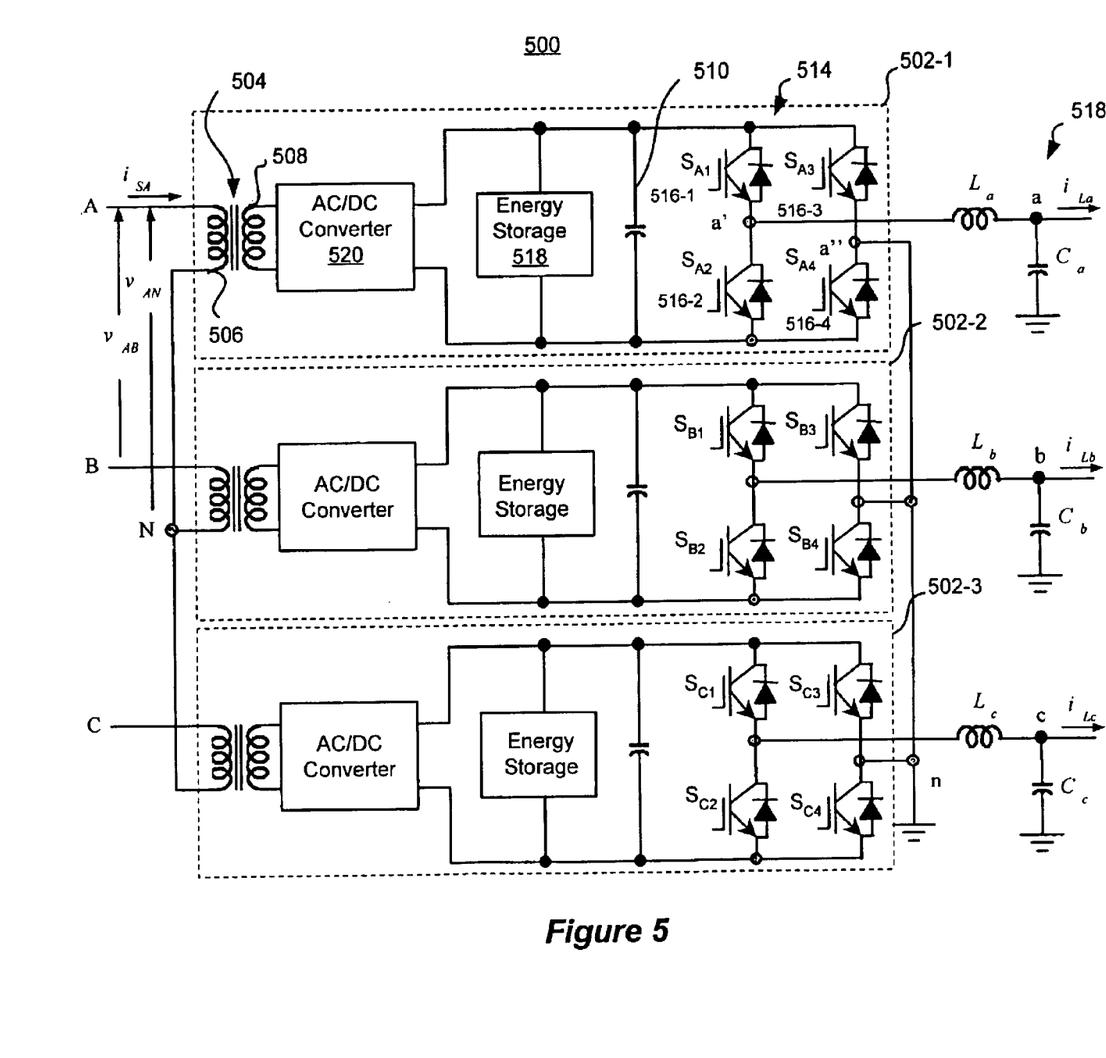
FIG. 5 is circuit diagram of an alternative version of the universal transformer having a reduced number of switches and transformer windings, in accordance with some embodiments of the present invention.

FIG. 5 is circuit diagram of a universal transformer 500 having a reduced number of switches and transformer windings, in accordance with some embodiments of the present invention with omission of the series connecting path. The transformer 500 includes a power conversion circuit 502-1 through 502-3 for each phase-leg. Each power conversion circuit 502 includes a conventional transformer 504 having a primary winding 506 and a secondary output winding 508, a AC/DC converter block 520, an energy storage device 518, a DC bus capacitor circuit 510 and an actively switched inverter circuit 514. Each switched inverter 514 includes semiconductor switches 516-1 through 516-4, which can be controlled (e.g., using PWM control) to convert DC voltage stored at the DC bus capacitor circuit 510 to an AC waveform. A low pass filter 518 is coupled to an output of the inverter 514 (node a'). The node between switches 516-3 and 516-4 (node a") is coupled to circuit ground.

The operation of the universal transformer 500 relies on the switched inverter 514, which produces output voltages that are independent of the source voltage. The transformer 500 performs all the functions of the transformer 100 shown in FIG. 1, except that it does not include a series path inverter. Thus, it relies on the energy storage devices 518 for voltage sag and under-voltage compensation.

Figure 6:
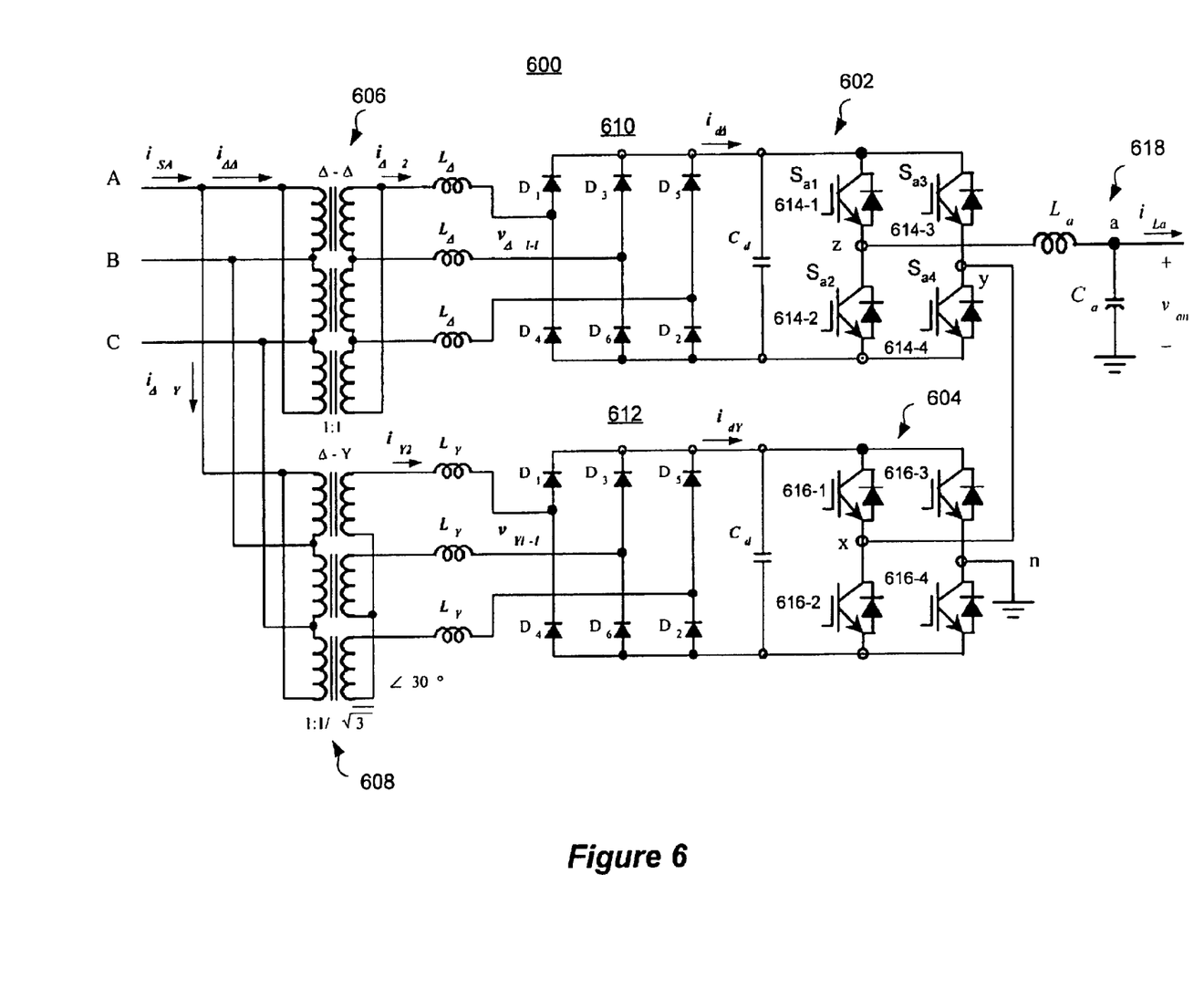
FIG. 6 is a circuit diagram of a cascaded inverter based universal transformer, in accordance with some embodiments of the present invention.

FIG. 6 is a circuit diagram of a cascaded inverter-based universal transformer 600, in accordance with some embodiments of the present invention. For simplification, FIG. 6 shows a three-phase input and only a single-phase output. In some embodiments, however, the transformer 600 is reconfigured to provide three-phase output.

The input side of the transformer 600 includes a Δ—Δ connection 606 and a Δ-Y connection 608, resulting in output waveforms that are separated by a phase angle (e.g., 30 degrees). The connection 606 is coupled in series with an AC/DC converter block 610 and a switched inverter 602. The connection 608 is coupled in series with an AC/DC converter block 612 and a switched inverter 604. The inverters 602, 604 are coupled together at nodes x and y to form a cascade inverter. In some embodiments, the AC/DC converter blocks 610 and 612 can be actively switched full-bridge rectifiers (FIG. 2). In other embodiments, the AC/DC converter blocks 610 and 612 can be simple diode bridges, as shown in FIG. 6.

The inverters 602 and 604 include semiconductor switches 614 and 616, respectively, which can be controlled to convert the DC voltage stored at a DC blocking capacitors ($C_d$) 620 and 622 with PWM (pulse width modulation) or any other suitable waveforms, such as a staircase type waveform. A filter circuit 618 can be coupled to the output of the inverter 602 (node z) to smooth the output waveforms.

Figure 7:
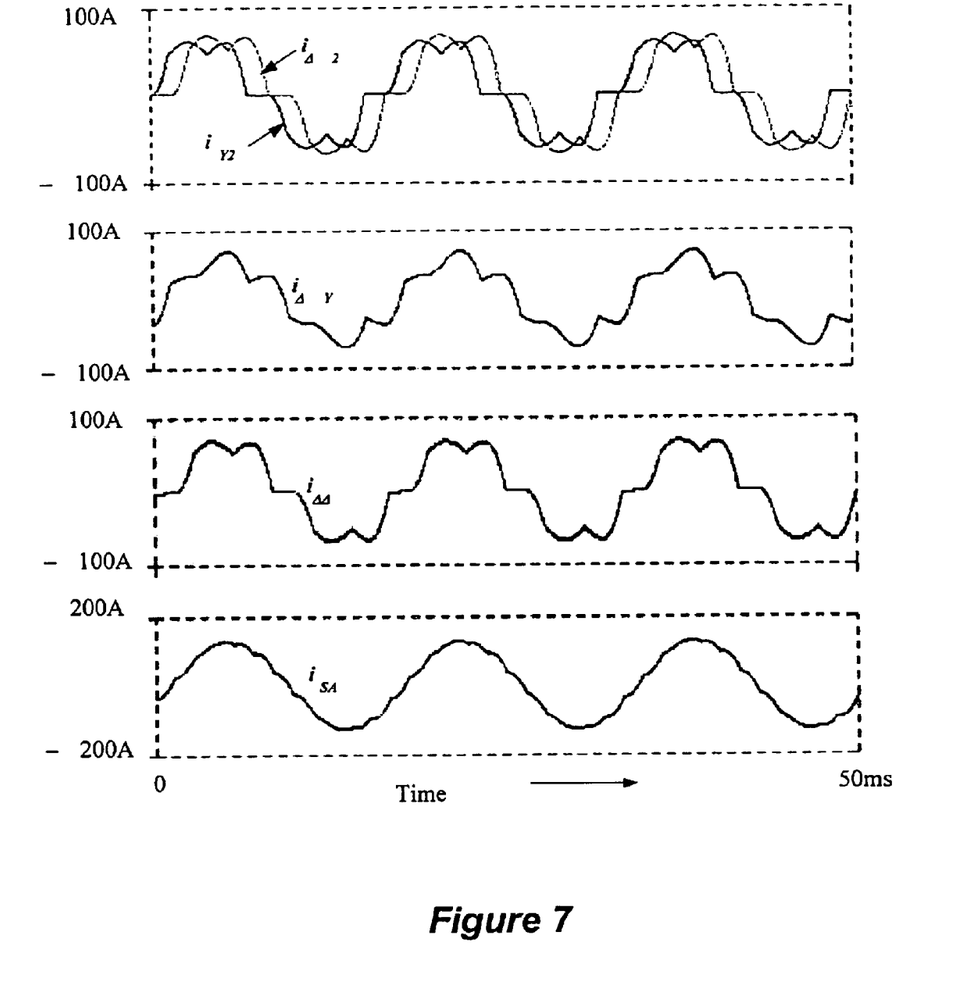
FIG. 7 is a graph illustrating individual universal transformer input currents, in accordance with some embodiments of the present invention.

While the individual rectifier currents $i_{dΔ}$ and $i_{dY}$ are harmonic distorted, the sum of the transformer currents at the input/source side ($i_{AΔ}$, $i_{AY}$) provide a significantly improved waveform that has the $5^{th}$ and $7^{th}$ harmonics cancelled. This type of phase-shift transformer and diode bridge connection provides "12-pulse rectification." FIG. 7 shows the individual transformer input currents, $i_{AΔ}$ and $i_{AY}$, and output currents, $i_{A2}$ and $i_{Y2}$, and the sum of the two transformer input currents, $i_{SA}$. The operation of cascaded inverters is further described in U.S. Pat. No. 5,642,275, which is incorporated by reference herein in its entirety.

Figure 8:
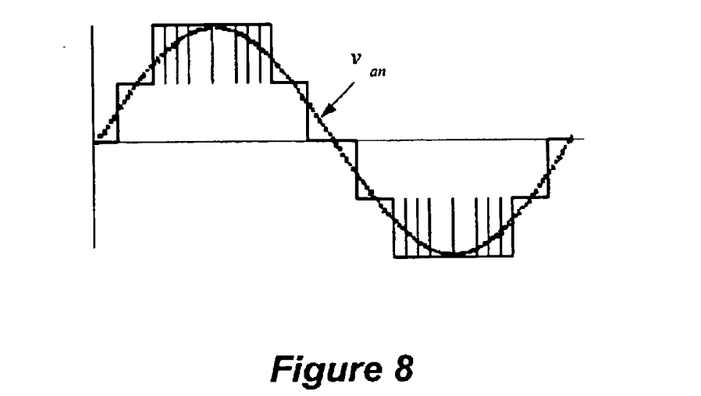
FIG. 8 is a graph illustrating an inverter output voltage, in accordance with some embodiments of the present invention.

FIG. 8 shows the inverter output voltage, $v_{an}$, of transformer 600 with one set of inverters switching with high-frequency PWM, and the other set of inverters switching only once per fundamental cycle. By optimizing the switching angle, the output waveform is less distorted and the filter size can be reduced. Other variations of the transformer 600 are also possible, such as adding more levels of cascaded inverters.

Figure 9:
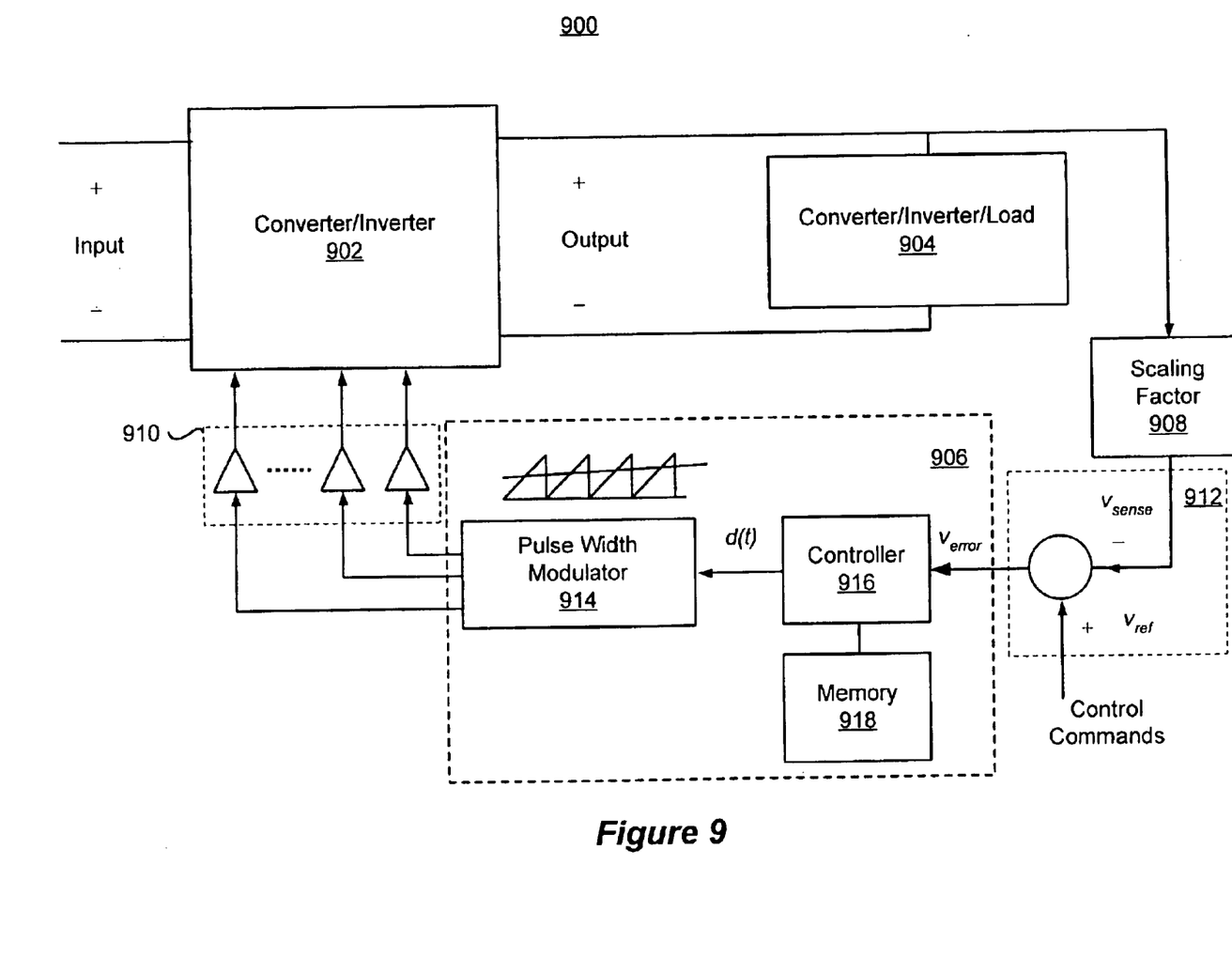
FIG. 9 is a block diagram of a converter/inverter control system, in accordance with some embodiments of the present invention.

FIG. 9 is a block diagram of a converter/inverter control system 900 for controlling a converter or inverter 902, in accordance with some embodiments of the present invention. The feedback control system 900 includes a processor 906 (e.g., microcomputer, digital signal processor), a scaling factor circuit 908, a set of gate drivers 910 and a command interface 912. The processor further includes a pulse width modulator 914, a controller 916 and memory 918 (e.g., DRAM, CD-ROM). The scaling factor circuit 908 and the gate drivers 910 isolate control signals from the power.

In operation, the processor 906 compares a command voltage $V_{ref}$ and a scaled feedback output signal $V_{sense}$ to determine an error signal $V_{error}$. The feedback signal, $V_{sense}$, is taken from the output of the converter/inverter 902. The error signal $V_{error}$ is received by the controller 916, which generally applies a proportional (P), proportional-integral (PI), or proportional-integral-differentiator (PID) gain to the error signal. The output of the controller is a smooth duty cycle signal, d(t). Note that in a typical application either a load (e.g., adjustable speed drive) or another converter/inverter 904 is coupled to the output of the converter/inverter 902.

The duty cycle of each switch is computed by the processor 906 based on one or more computer programs or gate pattern logic stored in memory 918. The resulting duty cycle signal, d(t), is then sent to the pulse width modulator 915 (PWM), which generally includes a set of voltage comparators. In some embodiments, one comparator is used for each pair of switches. For example, the switch pair $S_1$-$S_4$ in the actively switched inverter 112 (FIG. 1) can be controlled by a first comparator and the switch pair $S_3$-$S_6$ can be controlled by a second comparator. The PWM signals are then fed into the gate drivers 910 to turn the switches in the converter/inverter 902 on or off. The number of switches in the converter/inverter 902 depends on how many voltage levels and phases are to be controlled.

The control voltages d(t) (and therefore the output pulse width) can be varied to achieve different frequencies and voltage levels in any desired manner. For example, the processor 906 can implement various acceleration and deceleration ramps, current limits, and voltage-versus-frequency curves by changing variables (e.g., via the command interface 912) in control programs or gate pattern logic in processor 906.

If the duty cycle d(t) is greater than the voltage level of a reference waveform (e.g., a triangular waveform) at any given time t, then the PWM circuit 914 will turn on the upper switches (e.g., switches $S_{a1}$ and $S_{a4}$) of inverter 112 and turn off the lower switches (e.g., switches $S_{a3}$ and $S_{a6}$) of the inverter 112. For a three-phase PWM inverter embodiment (e.g., the embodiment shown in FIGS. 1, 5 and 7), three single-phase control circuits can be used with control voltages comprising sinusoidal waveforms shifted by 120 degrees between phases using techniques well-known in the art.

In some embodiments, the control system 900 includes a detection circuit configured to detect when the input poser source has a missing phase or is running under a single-phase condition and to generate control signals to be used by the command interface 912 to shut off the switches in one or more phase-legs of the universal transformer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A power conversion device, comprising:
    a transformer having a primary input winding and multiple secondary output windings; and
    a switched inverter circuit coupled to the secondary output windings and configurable to couple a first output winding with a parallel path inverter and configurable to couple a second output winding with a series path inverter.

2. The device of claim 1, wherein the series path inverter is a full-bridge inverter.

3. The device of claim 1, further comprising:
    an energy storage device coupled to the parallel path inverter for mitigating voltage disturbances.

4. The device of claim 1, further comprising:
    a filter coupled to the output of the transformer for smoothing output waveforms.

5. The device of claim 1, further comprising:
    an AC/DC converter block coupled to the parallel path inverter for converting Alternating Current (AC) waveforms into Direct Current (DC) waveforms.

6. The device of claim 5, wherein the AC/DC converter block is a full-bridge converter.

7. The device of claim 5, wherein the AC/DC converter block is a diode bridge.

8. The device of claim 1, wherein the series path inverter and the parallel path inverter comprise a plurality of configurable semiconductor switches.

9. The device of claim 8, wherein the semiconductor switches are gate controlled devices.

* * * * *